(12) United States Patent
Bodin et al.

(10) Patent No.: US 6,685,203 B1
(45) Date of Patent: Feb. 3, 2004

(54) INDIVIDUAL WHEEL SUSPENSION

(75) Inventors: Jan-Olof Bodin, Alingsås (SE); Stefan Petersen, Göteborg (SE); Andreas Lundmark, Göteborg (SE)

(73) Assignee: Volvo Lastvagner AB, Gothenburg (SE)

( * ) Notice: Subject to any disclaimer, the term of this patent is extended or adjusted under 35 U.S.C. 154(b) by 0 days.

(21) Appl. No.: 10/110,318
(22) PCT Filed: Oct. 16, 2000
(86) PCT No.: PCT/SE00/01995
§ 371 (c)(1), (2), (4) Date: Jul. 22, 2002
(87) PCT Pub. No.: WO01/28791
PCT Pub. Date: Apr. 26, 2001

(30) Foreign Application Priority Data

Oct. 18, 1999 (SE) ............................................... 9903731

(51) Int. Cl.⁷ ............................ B62D 21/11; B60G 3/00
(52) U.S. Cl. ....................... 280/124.109; 280/124.106; 280/124.137
(58) Field of Search ........................ 280/124.109, 124.1, 280/124.106, 124.137, 124.152, 124.116, 124.112, 124.17

(56) References Cited

U.S. PATENT DOCUMENTS

| | | | | |
|---|---|---|---|---|
| 4,132,431 A | * | 1/1979 | VON DER Ohe | 280/124.166 |
| 4,165,099 A | * | 8/1979 | Wagner et al. | 280/124.116 |
| 4,540,197 A | * | 9/1985 | Finn et al. | 280/6.157 |
| 4,614,247 A | * | 9/1986 | Sullivan | 180/24.02 |
| 5,401,049 A | * | 3/1995 | Richardson | 280/124.134 |
| RE35,168 E | * | 3/1996 | Golpe | 280/124.116 |

FOREIGN PATENT DOCUMENTS

| | | |
|---|---|---|
| DE | 2918506 A1 | 11/1980 |
| DE | 3926665 A1 | 2/1990 |
| DE | 4021096 A1 | 1/1992 |
| EP | 0806310 A2 | 11/1997 |
| WO | 9634775 A1 | 11/1996 |

\* cited by examiner

Primary Examiner—Yvonne R. Abbott
(74) Attorney, Agent, or Firm—Birch, Stewart, Kolasch & Birch, LLP

(57) ABSTRACT

An individual wheel suspension for vehicles built on a longitudinal frame and comprises a steering knuckle attachment, which at its lower, outer end is connected to and journalled in a wheel spindle. Also included is a pair of upper and lower torsion rod placed in the longitudinal direction of the vehicle and journalled in the steering knuckle attachment and a transverse section of the frame, to form a parallelogram. A transverse stabilizer bar is connected to the ends of one pair of the above corresponding torsion rod, which ends are facing away from the steering knuckle attachment and positioned on either side of the vehicle. The arrangement is also provided with a first shock absorber, placed between the lower end of the steering spindle attachment and the vehicle frame, as well as an adjustable suspension device, which connects the lower end of the steering spindle attachment and the vehicle frame. The steering spindle attachment is also pivotally attached to the vehicle frame at its upper end, via an upper supporting arm, and at its lower end, via a lower supporting arm.

14 Claims, 6 Drawing Sheets

INDIVIDUAL WHEEL SUSPENSION

This application is the national phase under 35 U.S.C. §371 of PCT International Application No. PCT/SE00/01995 which has an International filing date of Oct. 16, 2000, which designated the United States of America.

TECHNICAL FIELD

The invention relates to an individual wheel suspension for vehicles, especially for vehicles built on a traditional heavy vehicle frame using longitudinal beams.

BACKGROUND ART

Individual front wheel suspensions currently used in vehicles built on a frame, such as two longitudinal U- or I-profile beams, are often of the McPherson or double wishbone type. Such solutions have been difficult to implement without severely intruding into the available space for the engine compartment. The alternative has often been to relocate the engine, as seen in e.g. buses. Examples of known types of individual front wheel suspensions are shown in DE-A1-2918605, DE-A1-4021096, DE-A1-4412145, DE-A1-19515565 and U.S. Pat. No. 4,033,605.

A further problem with currently used wheel suspensions is that they limit the possible ground clearance and the choice of engine placement. It is desirable to be able to regulate the height of the vehicle chassis above ground level, while at the same time placing the engine as low as possible, in order to achieve a low centre of gravity and a level floor in the drivers cab. As a rule it is not possible to combine these requirements with the currently used wheel suspensions, in which a sprung, rigid wheel axle extends transversely underneath the frame and the engine.

DISCLOSURE OF INVENTION

The problems that accompany the currently used wheel suspensions have been solved by using an individual wheel suspension of the type described in the claims below. According to the invention the solution involves using an individual wheel suspension for vehicles built on a longitudinal frame and comprises a steering knuckle attachment, which at its lower, outer end is connected to and journalled in a wheel spindle. Also included is a pair of upper and lower torsion rod placed in the longitudinal direction of the vehicle and journalled in the steering knuckle attachment and a transverse section of the frame, to form a parallelogram. A transverse stabilizer bar is connected to the ends of one pair of the above corresponding torsion rod, which ends are facing away from the steering knuckle attachment and positioned on either side of the vehicle. The arrangement is also provided with a first shock absorber, placed between the lower end of the steering spindle attachment and the vehicle frame, as well as an adjustable suspension device, which connects the lower end of the steering spindle attachment and the vehicle frame. The steering spindle attachment is also pivotally attached to the vehicle frame at its upper end, via an upper supporting arm, and at its lower end, via a lower supporting arm.

The vehicle frame can also be provided with a substantially rectangular frame section, comprising two mainly vertical sections, attached directly to and on either side of the vehicle frame, and two mainly horizontal sections, which connect the upper and lower ends of the vertical sections. This subframe is used for attaching the supporting arms, shock absorbers and torsion rod that carries the steering knuckle attachment.

The result is a very compact wheel suspension that does not intrude into the available space for the engine compartment, as it lacks a sprung, rigid front axle. This allows the engine to be lowered, resulting in a lower centre of gravity and allows a planar floor in the driver's cab without having to raise the cab higher above ground level.

As the adjustable suspension device comprises one or more bellows attached between the lower part of the steering knuckle attachment and the vehicle frame, the level of the chassis can be adjusted over a large range. The bellows are preferably arranged in pairs on either side of the supporting arms.

By using supporting arms and torsion rod in all directions, the arrangement makes it possible to control camber and changes in the track width through the entire suspension range and under varying loads. It is particularly advantageous to use longitudinal torsion rod for taking up large loads during braking, since this gives a lower bending moment on the vehicle frame, compared to the traditional angled linkages normally used for individual suspensions.

BRIEF DESCRIPTION OF DRAWINGS

The embodiments of the description will be described with reference to the enclosed drawings, of which.

MODES FOR CARRYING OUT THE INVENTION

The preferred embodiments, which will now be described with reference to the drawings, are intended for a vehicle frame in the form of two longitudinal U- or I-beams 101, 102, wherein the engine is mounted between the beams and between the front wheels of the vehicle. In the following text the individual suspension arrangement is described for one side of the vehicle, unless otherwise indicated.

Figure 1:
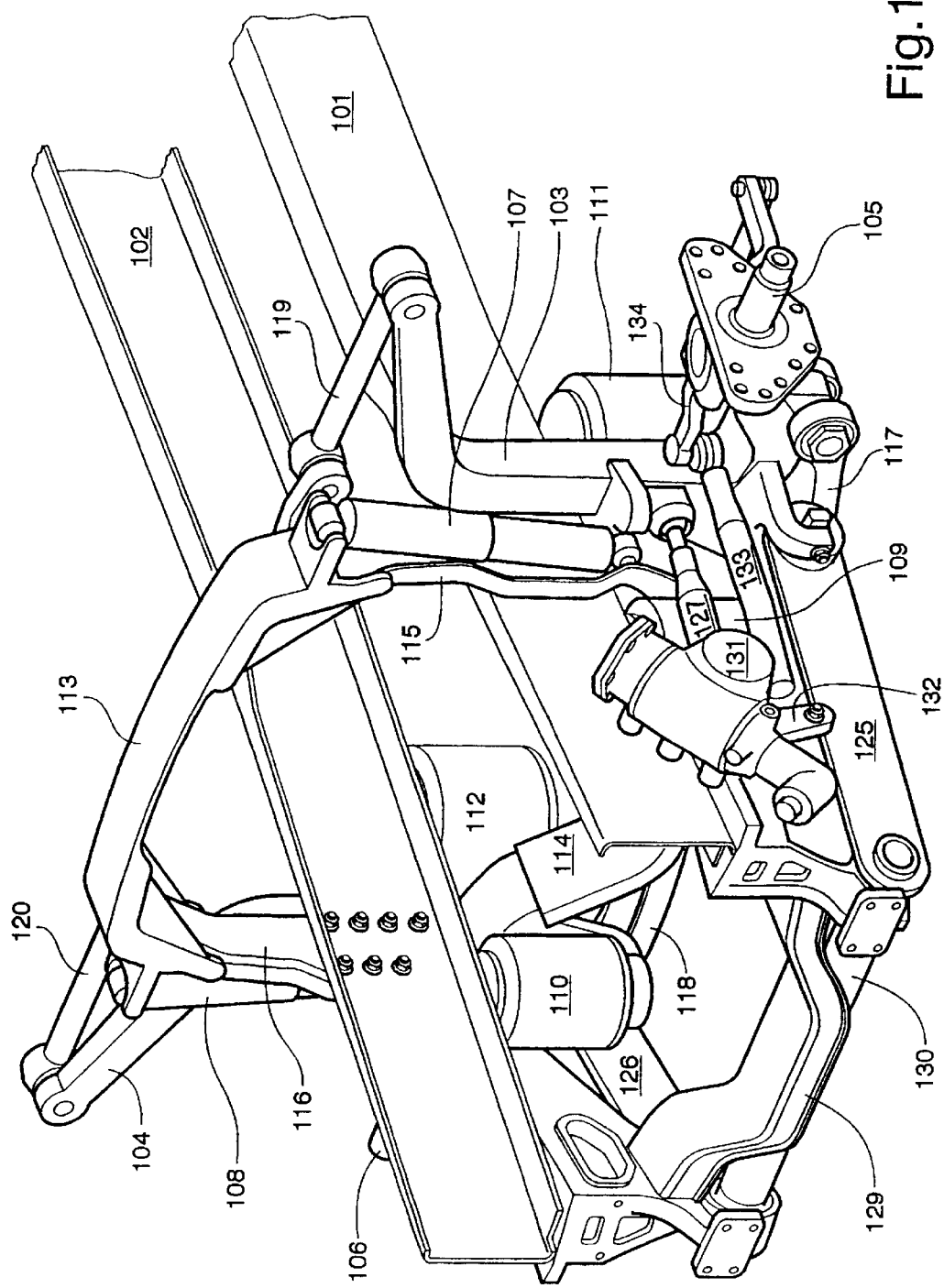
FIG. 1 shows a front perspective view of the wheel suspension.

With reference to FIG. 1 the embodiment includes two structures in the form of a pair of wheel spindle attachments (king posts) 103, 104; one on either side of the vehicle. Each king post 103, 104 connects their respective wheel spindle 105, 106 to a suspension arrangement, for taking up forces during the vertical movements of the wheels. The suspension comprises partly a shock absorber 107, 108 and partly a pair of bellows 109, 110, 111, 112 on either side of the vehicle. The lower end of the shock absorber 107, 108 is pivotally mounted to the king post 103, 104 and its upper end is pivotally mounted to the vehicle frame, preferably to a mainly rectangular frame section, or sub-frame 113, 114, 115, 116. The axial direction of the pivot points is mainly parallel to the longitudinal direction of the vehicle. The sub-frame comprises two vertical sections 115, 116, attached to the beams 101, 102 making up the vehicle frame, and two horizontal sections 113, 114, which connect the upper and lower ends of the vertical sections above and below the longitudinal beams 101, 102. The engine (not shown) is placed in the space enclosed by the horizontal sections 113, 114 of the subframe and the beams 101, 102. The bellows 109, 110, 111, 112 are arranged in pairs on either side of the vehicle, whereby their upper ends are attached along the frame of the vehicle and their lower ends are attached to the king post 103, 104 below the lower attachment points of the shock absorbers 107, 108. The bellows arranged on either side of a pair of transverse, lower supporting arms 117, 118, which are placed under the vehicle frame between the king posts 103, 104.

Figure 2:
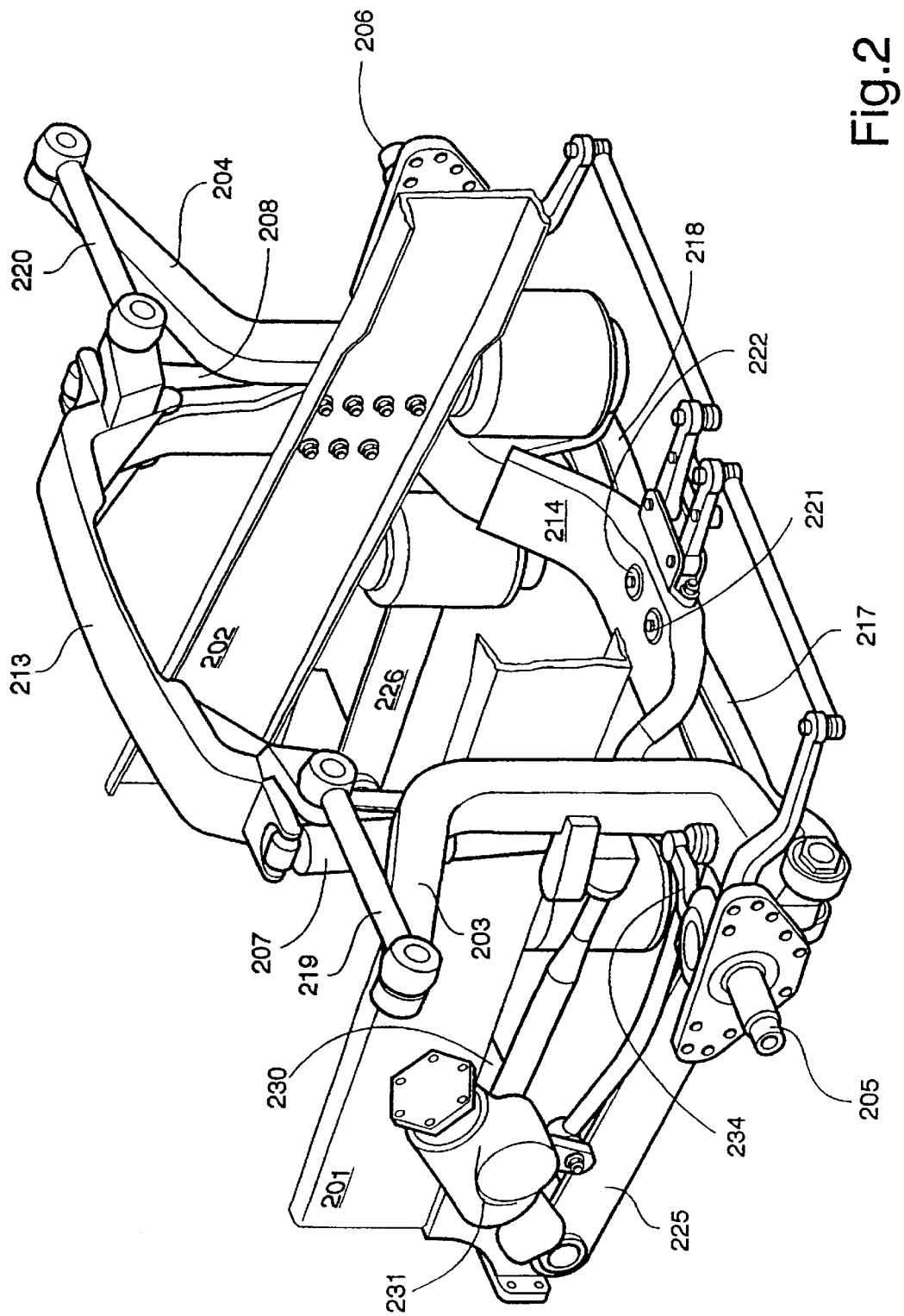
FIG. 2 shows a rear perspective view of the wheel suspension.

The lower supporting arms 217, 218 are part of a parallelogram designed to take up side forces, as shown in FIG. 2. Such a parallelogram is provided on both sides of the vehicle, each comprising a lower supporting arm 217, 218, the outer end of which is pivotally connected to the lower section of the king post 203, 204 and inner end is pivotally connected to the lower section 214 of the subframe. Said parallelogram further comprises an upper supporting arm 219, 220, the outer end of which is pivotally connected to the upper section of the king post 203, 204 and inner end is pivotally connected to the upper section 213 of the subframe. The pivoting joints for the upper supporting arm 219, 220 are preferably ball joints, having a main pivoting axis substantially parallel to the longitudinal direction of the vehicle. The lower supporting arm 217, 218 must also take up a moment around the vertical axis (the $M_z$-moment) at its outer pivoting joint. This joint has the shape of a fork, which is attached to a co-operating part of the king post and has its main pivoting axis in the longitudinal direction of the vehicle.

According to a first embodiment, the inner ends of the supporting arms 217, 218 are pivotally connected to the lower section 214 of the subframe by means of an elastic connection 221, 222. Each joint is made up of an elastic bushing 221, 222 in the form of a vertically mounted body made from an elastic material, such as rubber, which additionally allows for movement in multiple directions and damping of vibrations. Although the elastic properties of the joint allows for movement in multiple directions, its main pivoting axis is substantially parallel to the longitudinal direction of the vehicle.

According to a further embodiment, the lower supporting arms 217, 218 are pivotally connected to an intermediate section 224, which is connected to the lower section 214 by means of an elastic connection. The supporting arms 217, 218 pivotally connected to the ends of the intermediate section 224. The pivotal joints are in the shape of vertically mounted bodies made from an elastic material, with a main pivoting axis substantially parallel to the longitudinal direction of the vehicle. The intermediate section may be attached to the lower section 214, 414, whereby the elastic material in the pivotal joints allows for movement in multiple directions and is made from e.g. rubber, in order to dampen vibrations.

By selecting a suitable length for the supporting arms 217, 218 and the intermediate section 224, it is possible vary the extension length of said supporting arms between a length which is less than half the distance between the beams 201, 202 of the vehicle frame and a length which is substantially equal to or somewhat greater than the distance between the beams 201, 202 of the vehicle frame. If the length of the supporting arms is less than half the distance between the beams, then the inner ends of said arms 217, 218 are attached to the ends of the intermediate section 224 facing said inner ends.

If the length of the supporting arms is greater than half the distance between the beams, then the inner ends of said arms 217, 218 are attached to the respective ends of the intermediate section 224 facing away from said inner ends. The length of the supporting arms can thereby be chosen depending on the required road handling properties and the desired suspension adjustment properties.

According to a third embodiment, the supporting arms 217, 218 can be pivotally connected to the lower section 214 of the subframe, or the intermediate section 224, by fixed joints, such as ball and socket joints. Vibration damping and absorption of other small movements can be achieved by attaching the lower section 214 of the subframe to the vertical sections by means of elastic connections. These connections are preferably made from an elastic material, such as rubber.

Figure 3:
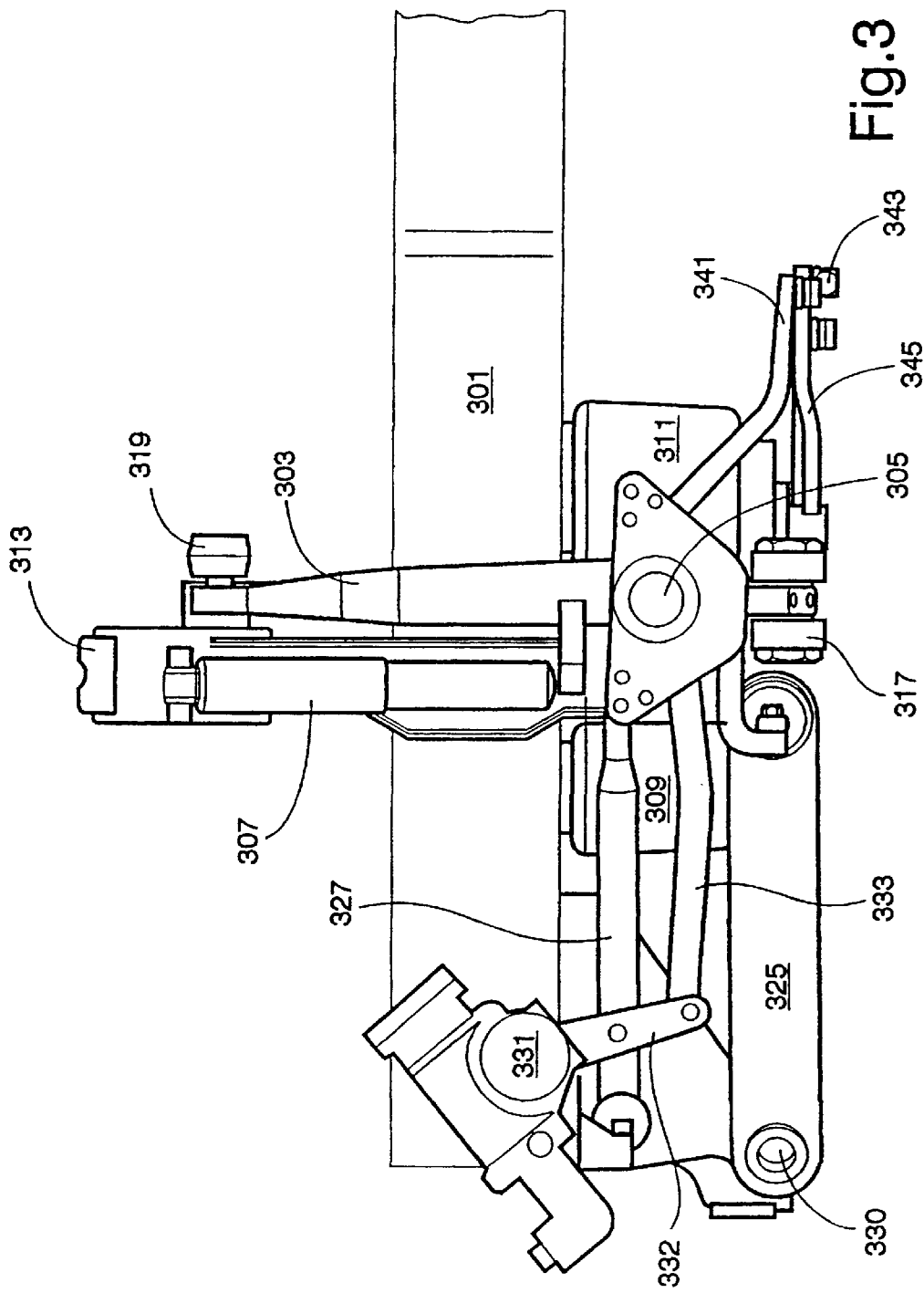
FIG. 3 shows a side view of the wheel suspension.

Horizontal forces in the longitudinal direction of the vehicle, and the moment which occurs during braking, is taken up by a pair of parallelograms placed on either side of the vehicle, as shown in FIG. 3. Each parallelogram comprises a lower and an upper torsion rod 325, 327, a bracket on the vehicle frame and the king post 303.

According to a preferred embodiment, the rear sections of the torsion rods 325, 327 are pivotally connected to the lower part of the king post 303, at vertically separated positions. The front sections of the torsion rods 325, 327 are pivotally connected to a bracket on the frame of the vehicle. The axes of the pivoted joints are substantially transverse to, or slightly angled to, the longitudinal direction of the vehicle. Said bracket can also serve as an attachment point for a front transverse section 329, 429. This transverse section 329, 429 connects the longitudinal beams 301, 302; 401, 402 of the frame, increases the torsional stiffness of the frame and can be a part of the engine support.

The lower torsion rod 125, 127, 225, 226 on either side of the vehicle can also be used as a stabilizer, by connecting their front ends by means of a transverse stabilizer bar 130, 230, as shown in FIGS. 1 and 2. The stabilizer may be integrated with or attached to the torsion rod on either side of the vehicle.

Figure 4:
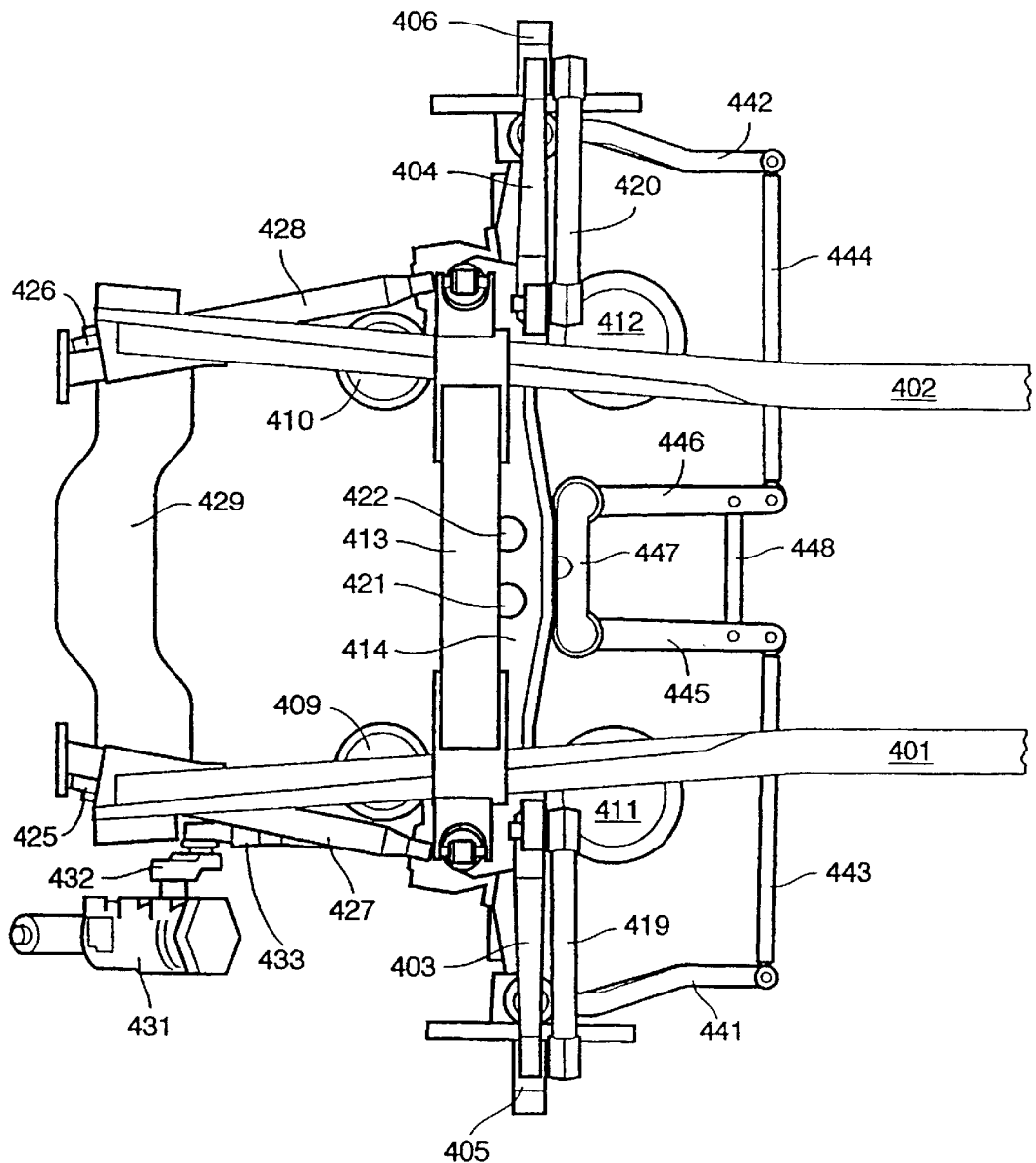
FIG. 4 shows a plan view of the wheel suspension.
Figure 5:
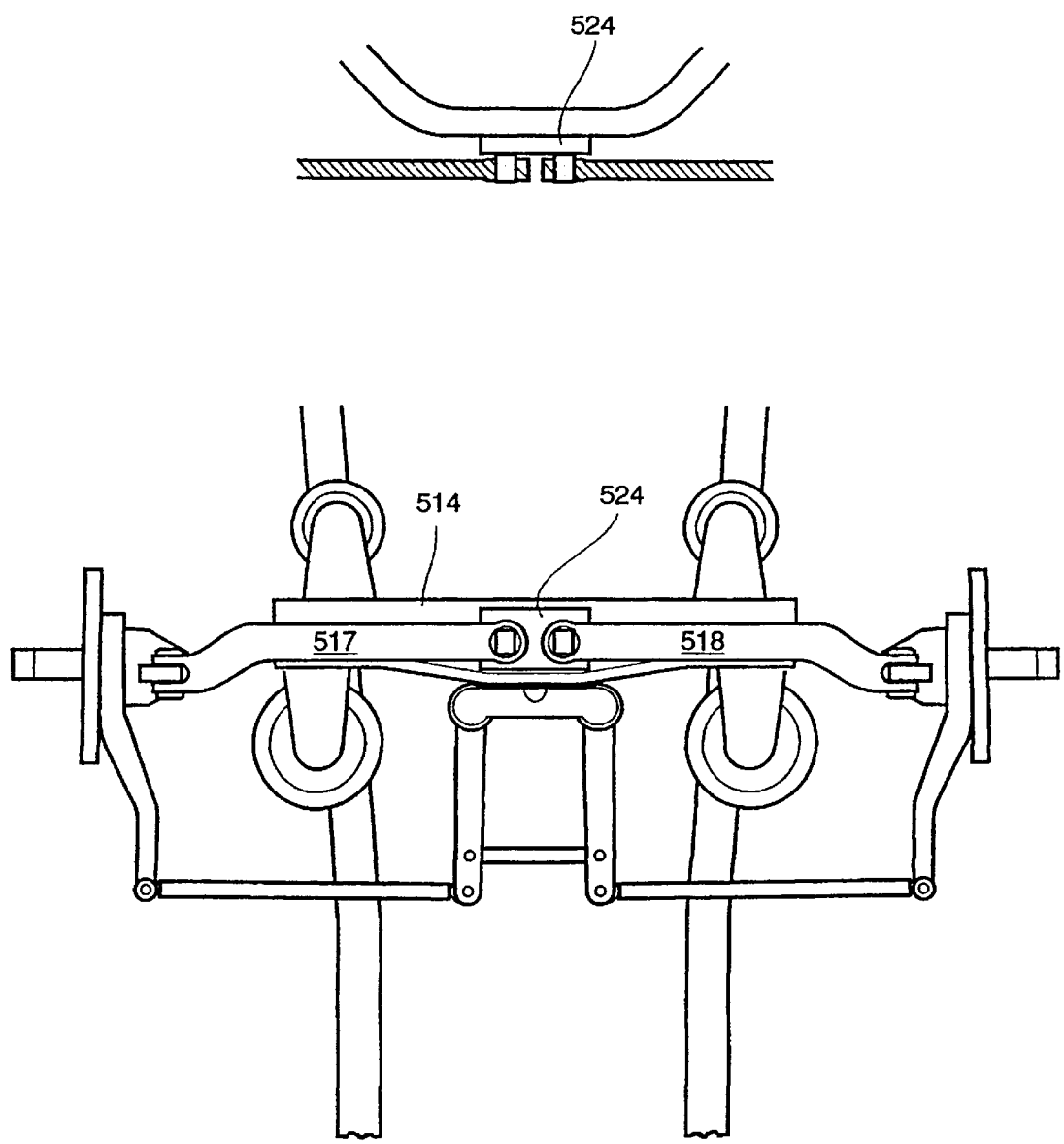
FIG. 5 shows a second embodiment of a pair of supporting arms in the wheel suspension, as seen from below.
Figure 6:
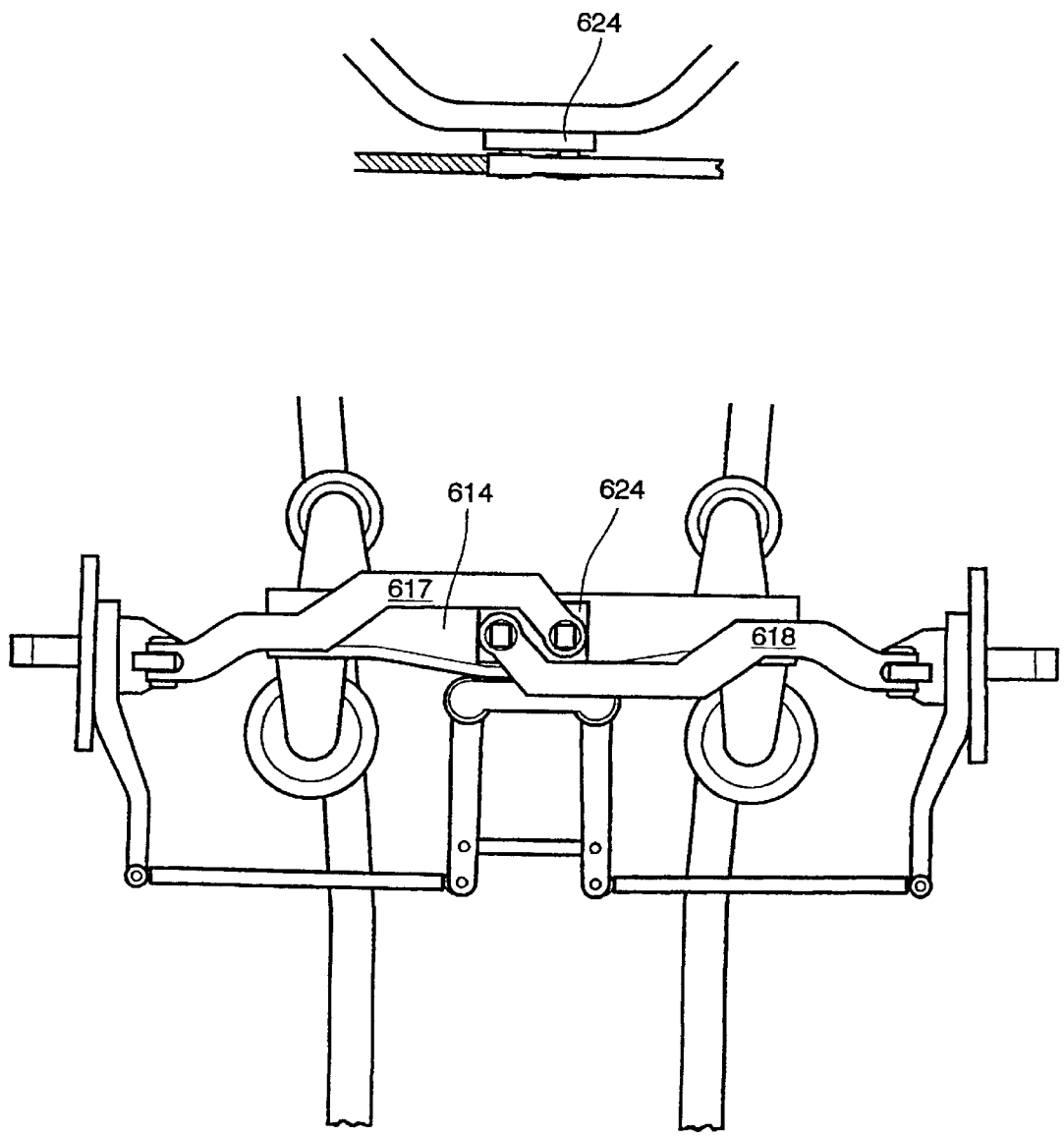
FIG. 6 shows a third embodiment of a pair of supporting arms in the wheel suspension, as seen from below.

The vehicle is steered in a conventional manner, using a steering gear 131, 132 acting on one of the wheel spindles 105, 305 via a pitman arm 132, 332, a linkage rod 133, 333 and a steering arm 134, as shown in FIGS. 1 and 3. In order to achieve the correct steering geometry, the transverse track rod that would normally transfer the steering motion to the opposite wheel spindle has been divided, as shown in FIG. 4. Each wheel spindle 405, 406 have been provided with a first linkage 441, 442 that is pivotally connected to a transverse track rod 443, 444. Said track rod 443, 444 is pivotally connected to a second linkage 445, 446, which in turn is pivotally connected to a linkage bracket 447 fixedly attached to the lower section 414 of the subframe midway between the longitudinal beams 401, 402. Finally, the respective second linkages 445, 446 are pivotally connected to a relay rod 448, positioned parallel to the transverse track rods 443, 444. By designing the steering linkages as two parallelograms with a central relay rod, it is possible to transmit steering movements with the correct geometry even though both wheels are individually suspended. All joints in said parallelogram have pivotal axes arranged in a substantially vertical direction, but they must also permit a certain deflection in connection with the vertical movements of the wheels. This can be achieved by using ball joints, elastic joints or some form of double joints All joints in the torsion rod and supporting arms, with the exception of the outer joints of the lower supporting arms, may be manufactured from rubber or similar materials having elastic properties, which give good insulation against vibrations transmitted from the road surface to the vehicle through the wheel suspension.

By using air bellows the suspension allows substantial regulation of the height of the chassis. The above embodiment allows for a regulation 200 mm upward and 100 mm downwards relative to the normal height. However, it is the field of application of the vehicle that decides the regulated range.

The invention is not limited to the above embodiments. For example, the subframe 113, 114, 115, 116 is not required for taking up large loads, such as brake loads, but is only needed for smaller side and vertical loading. Hence it is possible to build a structure without the additional subframe. Such an embodiment could have the lower supporting arms attached directly to the vehicle frame or to a separate transverse beam for this particular purpose.

The preferred subframe structure is mainly rectangular, but it is of course possible to use an arched, triangular or trapezoidal basic shape. External aspects, such as vehicle loading and space requirements may influence the design.

The described paired positioning of the bellows is the simplest solution from considerations of space and allows conventional air bellows to be used. It is, however, possible to use only one bellows on either side, mounted between the frame and the respective king post, but placed in front of or behind the supporting arm. Such a solution would on the other hand put a greater strain on both attachment points and bellows and would only be used in cases where there is no room for a paired arrangement of bellows.

It is also possible to replace the transverse stabilizer bar or a separately mounted stabilizer by using active shock absorbers, instead of conventional type absorbers.

What is claimed is:

1. Individual wheel suspension for vehicles built on a longitudinal frame including a pair of parallel beams comprising a king post, which at its lower, outer end is pivotally connected to a wheel spindle, and a shock absorber, which is mounted between the lower part of the king post and the vehicle frame, characterized in that a pair of upper and lower torsion rods, positioned substantially in parallel in the longitudinal direction of the vehicle, are pivotally connected to the king post and an attachment point on the vehicle frame; that at least one suspension device connects the lower part of the king post and the underside of the vehicle frame, and that the upper end of the king post is connected to the vehicle frame via an upper supporting arm, and the lower end of the king post is connected to the vehicle frame via a lower supporting arm at a point below and between the beams.

2. Wheel suspension according to claim 1, characterized in that the inner end of the lower supporting arm is pivotally connected to and resiliently attached to the vehicle frame.

3. Wheel suspension according to claim 1 or 2, characterized in that the vehicle frame is provided with a mainly rectangular subframe including two substantially vertical sections mounted directly on the vehicle frame, on either side of said frame, and two substantially horizontal, upper and lower transverse sections connecting the upper and lower parts of the vertical sections, whereby the supporting arms and shock absorbers which carry the king post are mounted on said subframe.

4. Wheel suspension according to claim 3, characterized in that the lower section of the subframe is resiliently connected to the two vertical sections of the subframe.

5. Wheel suspension according to claim 4, characterized in that the inner part of the lower supporting arm is pivotally connected to the lower section of the subframe.

6. Wheel suspension according to claim 1, characterized in that the outer part of the lower supporting arm is pivotally connected to the lower part of the king post, and that the inner part of the lower supporting arm is pivotally connected to and resiliently attached to an intermediate section, which is mounted on the vehicle frame.

7. Wheel suspension according to claim 2 or 6, characterized in that the resilient attachment of the lower supporting arm comprises a vertically mounted rubber bushing, the upper end of which is attached to the vehicle.

8. Wheel suspension according to claim 6, characterized in that the inner end of the supporting arm is pivotally connected to the end of said intermediate section facing the supporting arm.

9. Wheel suspension according to claim 6, characterized in that the inner end of the supporting arm is pivotally connected to the end of said intermediate section facing away from the supporting arm.

10. Wheel suspension according to claim 1, characterized in that the suspension device is vertically adjustable.

11. Wheel suspension according to claim 10, characterized in that the adjustable suspension device comprises one or more bellows attached between the lower part of the king post and the vehicle frame.

12. Wheel suspension according to claim 10, characterized in that the adjustable suspension device comprises one bellows on either side of the lower supporting arm.

13. Wheel suspension according to claim 1, characterized in that a transverse stabilizer is integrated in or attached to the ends of one pair of torsion rods facing away from the king posts on their respective side of the vehicle.

14. Wheel suspension according to claim 1, characterized in that the shock absorber is an active shock absorber, which also functions as a stabilizer.

* * * * *